United States Patent [19]

Summers et al.

[11] Patent Number: 5,034,026

[45] Date of Patent: Jul. 23, 1991

[54] POLYBENZAZOLE POLYMERS CONTAINING INDAN MOIETIES

[75] Inventors: John D. Summers, New Town Square, Pa.; Ritchie A. Wessling, Berkeley, Calif.

[73] Assignee: The Dow Chemical Company, Midland, Mich.

[21] Appl. No.: 513,316

[22] Filed: Apr. 20, 1990

[51] Int. Cl.$^5$ .................... B01D 53/22; B01D 71/56
[52] U.S. Cl. ........................................ 55/16; 55/68; 55/70; 55/73; 55/158
[58] Field of Search ............ 55/16, 68, 158, 70, 55/73, 66

[56] References Cited

U.S. PATENT DOCUMENTS

| | | |
|---|---|---|
| 3,951,920 | 4/1976 | Senoo et al. . |
| 4,020,142 | 4/1977 | Davis et al. ............... 264/347 |
| 4,157,960 | 6/1979 | Chang et al. ............. 55/16 X |
| 4,172,885 | 10/1979 | Perry ............................ 55/16 X |
| 4,180,552 | 12/1979 | Graham et al. ............ 55/16 X |
| 4,323,453 | 4/1982 | Zampini ..................... 55/158 X |
| 4,472,175 | 9/1984 | Malon et al. ................... 55/16 |
| 4,533,692 | 8/1985 | Wolfe et al. . |
| 4,533,693 | 8/1985 | Wolfe ............................ 524/417 |
| 4,533,724 | 8/1985 | Wolfe et al. . |
| 4,634,530 | 1/1987 | Kuder et al. .............. 210/500.23 |
| 4,662,905 | 5/1987 | Matsuura et al. ........... 55/16 X |
| 4,703,103 | 10/1987 | Wolfe et al. . |
| 4,734,466 | 3/1988 | Kindler ......................... 525/433 |
| 4,772,678 | 9/1988 | Sybert et al. ................... 528/179 |
| 4,783,203 | 11/1988 | Doshi .................................. 55/16 |
| 4,818,593 | 4/1989 | Engel .............................. 428/220 |
| 4,828,699 | 5/1989 | Soehngen ................... 210/500.28 |
| 4,845,150 | 7/1989 | Kovak et al. .................... 524/602 |
| 4,898,924 | 2/1990 | Chenevey ......................... 528/183 |

FOREIGN PATENT DOCUMENTS

| | | |
|---|---|---|
| 8912072 | 12/1989 | PCT Int'l Appl. . |
| 8912546 | 12/1989 | PCT Int'l Appl. . |
| 8912547 | 12/1989 | PCT Int'l Appl. . |
| 2211193 | 6/1989 | United Kingdom . |

OTHER PUBLICATIONS

Mahoney et al., *Porous Polybenzoxazole and Polybenzothiazole Articles and Processes for Making Them*, Ser. No. 513,345 (filed Apr. 20, 1990).
11Ency. Poly. Sci. & Eng., *Polybenzothiazoles and Polybenzoxazoles*, 601, (J. Wiley & Sons 1988).
Central Glass Co. Ltd., *Gas Separating Membrane*, Japanese Kokai 1-159024 (English translation enclosed).
23 *Polymer Eng. & Sci.* 784 (Oct. 1983).
Lusignea, "Film Processing and Applications for Rigid-rod Polymers," *The Materials Science and Engineering of Rigid Rod Polymers* 265-76 (1989).

*Primary Examiner*—Robert Spitzer

[57] ABSTRACT

Polybenzazole polymer containing indan moieties may be synthesized. Those polymers can be fabricated into membranes, which are useful for gas separations.

52 Claims, No Drawings

POLYBENZAZOLE POLYMERS CONTAINING INDAN MOIETIES

BACKGROUND OF THE INVENTION

The present invention relates to the art of polybenzazole polymers and membranes containing them.

Gas-separation membranes separate mixtures of gases by permitting one gas in the mixture to diffuse through the membrane from a region of high pressure to a region of lower pressure at a faster rate than another gas in the mixture. The result is an enriched stream of the faster diffusing gas on the low pressure side of the membrane and an enriched stream of the slower diffusing gas on the high pressure side of the membrane. Gas separation membranes may be isotropic, in which the entire membrane is a dense polymer traversed by solution-diffusion mechanisms, or they may be asymmetric, in which a dense polymer skin is attached to a porous layer of the same polymer, or they may be composite membranes in which a dense layer of one polymer is attached to a porous layer of a different polymer. In asymmetric and composite membranes, the porous polymer acts to support the membrane and possibly to filter out non-gaseous impurities, but it does not ordinarily assist in the separation of gases. That function is performed by the dense skin of an asymmetric membrane or the dense discriminating layer of a composite membrane.

The separation properties of a gas-separation membrane are typically characterized in terms of permeability, flux and selectivity. The permeability of a membrane with respect to a particular gas is measured in units of Barrers (Ba). One Barrer is defined as:

$$10^{-10} \frac{(cm^3 \text{ at STP permeant crossing membrane})(cm \text{ thickness of membrane})}{(cm^2 \text{ surface of membrane})(second)(cm \text{ Hg pressure across membrane})}$$

The flux of the membrane is the speed at which a particular gas crosses the membrane. It is equal to permeability divided by membrane thickness. A standard flux unit is typically:

$$10^{-6} \frac{(cm^3 \text{ at STP permeant crossing membrane})}{(cm^2 \text{ surface of membrane})(second)(cm \text{ Hg pressure across membrane})}$$

Selectivity is the permeability or flux of the faster permeating gas divided by the permeability or flux of the slower permeating gas. It is a unitless measurement.

It is desirable that a membrane have both high selectivity and high flux with respect to the gas or gases which selectively permeate through the membrane. However, it is frequently found that modifications in a membrane which increase selectivity also decrease flux, and vice-versa. It is also desirable for the membrane to possess sufficient strength to form thin membranes which can be handled and used without tearing. Additional desirable characteristics include increased high-temperature stability and resistance to common organic solvents, contaminants and vapors.

What are needed are polymers having two or more qualities of high permeability, high flux, high strength, high continuous use temperatures and/or high resistance to common organic solvents and vapors.

SUMMARY OF THE INVENTION

One aspect of the present invention is a polybenzoxazole or polybenzothiazole polymer containing a plurality of repeating units which comprise:

(1) a benzo-bis-azole moiety containing a first aromatic group fused with a first and a second azole ring, each azole ring being selected from the group consisting of oxazole and thiazole rings; and (2) a divalent organic moiety bonded to the 2-carbon of the first azole ring, said divalent organic moiety containing an indan moiety.

A second aspect of the present invention is a membrane comprising the previously described polymer.

A third aspect of the present invention is a process for separating a mixture of gases having differing permeability in the previously described polymer, comprising the step of placing the mixture of gases in a higher pressure zone which is divided from a lower pressure zone by a membrane of the present invention under conditions such that at least one gas permeates through the membrane at a faster rate than another gas in the mixture.

A fourth aspect of the present invention is an apparatus comprising:

(1) a higher pressure zone which can maintain a mixture of gases at a relatively high pressure;

(2) membrane of the present invention;

(3) a low pressure zone, said elements being arranged such that gas in the high zone may enter the low pressure zone by permeating through the membrane but by no other pathway.

A fifth aspect of the present invention is a process for synthesizing a polymer of the present invention comprising the step of contacting an AA-monomer containing an indan moiety with a BB-monomer in a dehydrating, non-oxidizing solvent acid solution under conditions such that a polymer of the present invention is formed.

Polymers of the present invention may be used for a number of application already reported for polybenzazole polymers, such as in fibers and films for structural and electronics applications as described in 11 Encyclopedia Poly. Sci. & Eng., *Polybenzothiazoles and Polybenzoxazoles*, 601, 625-31 (J. Wiley & Sons 1988). Polymers of the present invention are more particularly useful for making membranes of the present invention, which can be used in an apparatus of the present invention to separate mixtures of gases by the first process of the present invention.

DETAILED DESCRIPTION OF THE INVENTION

Definitions

The following terms are used repeatedly throughout this application, and have the meaning and preferred embodiments defined herein unless otherwise specified.

AA-Monomer - A monomer suitable for synthesizing polybenzazole polymers, comprising two electron-deficient carbon groups linked by a divalent organic moiety (DM) which is inert with respect to all reagents under polybenzazole polymerization conditions. The electron-deficient carbon groups have the definition and preferred embodiments given herein. The divalent organic moiety is preferably alkyl or an aromatic group, as herein defined, is more preferably an aromatic group, and is most preferably a six-membered aromatic group.

Examples of suitable AA-monomers and references to their synthesis are provided in U.S. Pat. No. 4,533,693 at columns 25-32, Tables 4-6, which is incorporated herein by reference. Preferred examples of AA-monomers include terephthalic acid, isophthalic acid, bis-(4-benzoic) acid and oxy-bis-(4-benzoic acid) and acid halides and anhydrides thereof. Other examples of AA-monomers include bis-(4-benzoic acid) sulfone, bis-(4-benzoic acid) ketone, bis-(4-benzoic acid)-isopropane, 1,1,1,3,3,3-hexafluoro-2,2-bis-(4-benzoic acid)-propane, 1,4-bis-(oxy-4-benzoic acid)-perfluorocyclobutane and acid halides and anhydrides thereof. At least some AA-monomers used to make polymers of the present invention must contain an indan moiety.

AB-Monomer - A monomer suitable for synthesizing polybenzazole polymers, comprising an aromatic group, an o-amino-basic moiety bonded to the aromatic group, and an electron-deficient carbon group bonded to the aromatic group. The aromatic group, the electron-deficient carbon group and the o-amino-basic moiety have the definitions and preferred embodiments given herein. Examples of suitable AB-monomers and processes for their synthesis are provided in U.S. Pat. No. 4,533,693 at columns 33-35, Tables 7-8, which is incorporated herein by reference. Preferred examples of AB-monomers include 3-amino-4-hydroxybenzoic acid, 3-hydroxy-4-aminobenzoic acid and the acid halides thereof. AB-monomers are frequently stored as salts of hydrogen chloride or phosphoric acid, because the free-base of the monomer is susceptible to air oxidation.

o-Amino-basic moiety - a moiety, which is bonded to an aromatic group, comprising, and preferably consisting of,
(1) a primary amine group bonded to the aromatic group and
(2) a hydroxy, thiol or primary or secondary amine group bonded to the aromatic group ortho to said primary amine group.
In monomer useful for making polymers of the present invention, the o-amino-basic moiety comprises a hydroxy or thiol moiety, and most preferably comprises a hydroxy moiety.

Aromatic group (Ar) - any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may comprise a nitrogen-containing heterocyclic ring, but is preferably carbocyclic and more preferably hydrocarbyl.

Unless otherwise specified, each aromatic group may comprise a single aromatic ring, a fused ring system or an unfused ring system containing two or more aromatic moieties joined by bonds or by divalent moieties which do not substantially interfere with the synthesis, fabrication or use of the polymer which contains the aromatic ring. Suitable divalent moieties comprise, for example, a carbonyl group, a sulfonyl group, an oxygen atom, a sulfur atom, an alkyl group and/or a perfluorinated alkyl group. Each aromatic group is preferably a single six-membered ring.

Each aromatic group may contain substituents which are stable in solvent acid and do not interfere with further reactions of the moiety which the aromatic group is part of. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring - an oxazole, thiazole or imidazole ring. The carbon atom bonded to both the nitrogen atom and the oxygen, sulfur or second nitrogen atom is the 2-carbon, as depicted in Formula 1

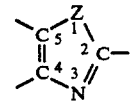

wherein Z is -O -, -S- or -NR-; and R is hydrogen, an aromatic or an aliphatic group, preferably hydrogen or an alkyl group, and most preferably hydrogen. In polymers of the present invention, each azole ring is independently oxazole or thiazole and is preferably oxazole. In PBZ polymers, the 4- and 5-carbon of each azole ring is ordinarily fused with an aromatic group.

Azole-forming moiety - an "o-amino-basic moiety" or "electron-deficient carbon group," as those terms are defined herein.

BB-Monomer - A monomer suitable for synthesizing polybenzazole polymers, comprising an aromatic group and two o-amino-basic moieties which are bonded to the aromatic group. The aromatic group and the o-amino-basic moieties have the definitions and preferred embodiments given herein. Examples of suitable BB-monomers and processes for synthesis are provided in U.S. Pat. Nos. 4,533,693 (at columns 19-24, Tables 1-3); 4,766,244 and 4,806,688: which are incorporated herein by reference. Examples of preferred BB-monomers include 4,6-diaminoresorcinol, 2,5-diaminohydroquinone, 1,4-dithio-2,5-diaminobenzene, bis-(3-amino-4-hydroxyphenyl) ether, bis-(3-amino-4-hydroxy-phenyl) sulfone, bis-(3-amino-4-hydroxy-phenyl) ketone, bis-(3-amino-4-hydroxy-phenyl) isopropane, 1,1,1,3,3,3-hexafluoro-2,2- bis-(3-amino-4-hydroxy-phenyl)-propane or 3,3'-diamino4,4'-dihydroxy-biphenyl. BB-monomers are frequently stored as salts of hydrogen chloride or phosphoric acid, because the free base of the monomer is susceptible to air oxidation.

Electron-deficient carbon group (Q) - any group containing a carbon atom which can react in the solvent acid with an o-amino-basic moiety to form an azole ring, such as the groups listed in column 24, lines 59-66 of the 4,533,693 patent, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or iodine and more preferably chlorine.

Polybenzazole (PBZ) polymer - A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each mer unit contains an oxazole ring bonded to an aromatic group, which need not necessarily be a benzene ring. The term "polybenzoxazole (PBO)" also refers broadly to poly(phenylene-benzobisoxazole)s and other polymers wherein each mer unit comprises a plurality of oxazole rings fused to an aromatic group. The same understandings shall apply to the terms polybenzothiazole (PBT) and polybenzimidazole (PBI).

Solvent acid - any non-oxidizing liquid acid capable of dissolving PBZ polymers, such as sulfuric acid, methanesulfonic acid, trifluoromethylsulfonic acid, polyphosphoric acid and mixtures thereof. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide. Preferred concentrations of $P_2O_5$ in the methanesulfonic acid are described in U.S. Pat. Nos. 4,847,350 and 4,722,678, which are incorporated by reference. Concentrations of $P_2O_5$ in the polyphosphoric acids are described in U.S. Pat. Nos. 4,533,693 and 4,722,678, which are incorporated by reference. It preferably contains at least about 80 weight percent $P_2O_5$ at the commencement of the reaction, more preferably at least about 85 weight percent and most preferably 87 weight percent and preferably has a $P_2O_5$ content of at most about 90 percent, more preferably at most about 88 percent.

Indan-Containing Polymers

Polymers of the present invention contain mer units which comprise benzo-bis-azole moieties linked by divalent organic moieties containing indan groups.

Benzo-bis-azole moieties in polymers of the present invention contain a first aromatic group fused with two azole rings. The first aromatic group has the definition and preferred embodiments previously given. It is preferably represented by either Formula 2(a) or 2(b), and is more preferable represented by Formula 2(a):

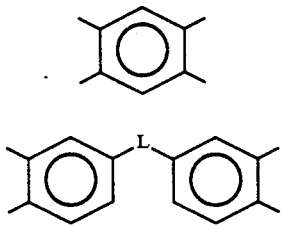

wherein L is carbonyl, sulfonyl, an oxygen atom, a lower ($C_{1-6}$) alkylene group, a halogenated lower alkylene group or a bond. The aromatic group may have substituents which do not interfere with the synthesis, fabrication or use of the polymer, such as fluorine atoms, chlorine atoms or lower alkyl groups. A first aromatic group consisting essentially of a single six-membered ring preferably has no such substituents, but a first aromatic group comprising an unfused ring system may preferably contain one or more substituents to hinder rotation around the single bond(s). An aromatic group which comprises an unfused ring system, such as 2(b), and particularly wherein L is a perfluorinated alkylene group, may provide a polymer having higher permeability but lower selectivity than a similar polymer wherein the first aromatic group is a phenylene moiety as in 2(a). The first aromatic group is preferably chosen such that the benzo-bis-azole moiety is substantially rigid, with little opportunity to change the packing of the polymer chains by rotation around a double bond.

The azole rings fused with the aromatic group are either oxazole or thiazole rings. Each is preferably an oxazole ring. The polymer may contain both oxazole and thiazole rings, forming a block copolymer. Azole rings may be in either cis- or trans-position as defined in 11 Encyclopedia Poly. Sci. & Eng., supra, at 602, which is incorporated herein by reference. Thiazole rings are preferably in transposition with respect to each other, and oxazole rings are preferably in cis-position with respect to each other.

Benzo-bis-azole units are linked by divalent organic moieties, forming AA/BB-mer units, for instance as illustrated in Formula 3:

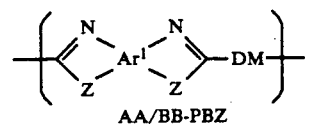

AA/BB-PBZ wherein $Ar^1$ is a first aromatic group, DM is a divalent organic moiety and each Z is an oxygen or a sulfur atom. (For the purpose of this application, when the nitrogen atoms and Z moieties of a mer unit are depicted as bonded to an aromatic group without indicating their position, as in Formulae 3, it shall be understood that:

(1) each nitrogen atom and Z group within a given azole ring are bonded to the aromatic group in ortho position with respect to each other; and (2) if the mer unit has two azole rings, one nitrogen atom and Z moiety may be in either cis position or trans position with respect to the other nitrogen atom and Z moiety. The same understandings apply with respect to amine groups and Z moieties in a BB-monomer.)

The divalent organic moiety must not interfere with the synthesis, fabrication or use of the polymer. It should not contain hydroxy groups, thiol groups, amine groups, or any group which is unstable in the reaction medium.

At least some divalent organic moieties contain an indan moiety. Each indan moiety contains a second aromatic ring fused to a five-membered ring which is saturated, except for the two carbon atoms which are part of the aromatic group. Each indan moiety is linked to the rest of the polymer by a single bond to the aromatic group and a single bond to one of the saturated carbon atoms. Each indan moiety is preferably represented by Formula 4(a):

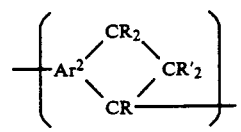

wherein $Ar^2$ is a second aromatic group, and each R and R' is a hydrogen atom or a halogen or lower ($C_{1-6}$) alkyl substituent. The indan moiety and substitents on it are preferably chosen to provide a bent irregular chain contour without a great deal of freedom to rotate around single bonds to alter the contour.

The second aromatic group has the meaning and preferred embodiments previously defined. It is preferably carbocyclic. It may contain a plurality of fused or unfused rings but is preferably a single six-membered ring. It may be substituted with moieties which do not interfere with synthesis, fabrication or use of the polymer, such as halogens and lower carbon alkyl groups, but preferably contains no substituents other than the saturated ring. The bond linking the aromatic ring to the remainder of the polymer is preferably para to one of the carbon atoms which is part of the saturated ring. The second aromatic group is most preferably represented by Formula 5:

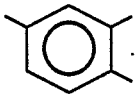
(5)

The saturated ring of the indan moiety should be carbocyclic and, except for the carbon atoms which make up part of the aromatic group, should contain no unsaturated bonds. It has a single bond linking it to the remainder of the polymer. That bond may be to the 2-carbon, but is preferably to the 1- or 3-carbon, as those carbon atoms are numbered in Formula 6:

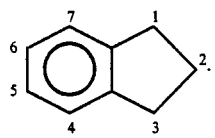
(6)

The saturated ring preferably contains substituents of sufficient number and size that rotation around the bond is restricted. The substituents may be any which do not interfere with the synthesis, fabrication or use of the polymer. It preferably has at least one substituent. More preferably, one of the 1- and 3-carbons has two substituents and the other has one substituent and a bond linking it to other mer units in the polymer. Substituents are preferably chosen to sterically limit the degree of freedom in the system, i.e. they are large enough to block rotation of the indan moiety around single bonds and they are symmetrical when rotated around the single bond linking them to the indan moiety. For instance, methyl, t-butyl, phenyl and sometimes cyclohexyl substituents are ordinarily preferably to ethyl, n-propyl, n-butyl, isopropyl, isobutyl or alkoxy substituents. Halogen atoms may serve as substituents. The most preferred substituents are methyl and t-butyl groups.

Each indan moiety is preferably represented by Formula 4(b)

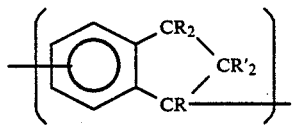
4(b)

wherein each R and R' is independently a hydrogen atom or a substituent. Each R is preferably a substituent and each R' is preferably a hydrogen atom. Each indan moiety is most preferably represented by formula 4(c)

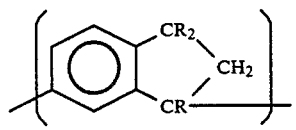
4(c)

wherein each R is independently a methyl or t-butyl group, as previously described.

The divalent organic moiety (DM) may consist essentially of an indan moiety bonded directly to the first azole ring of one benzo-bis-azole moiety and to a second azole ring of an adjacent mer unit, for instance as illustrated in formula 7(a)

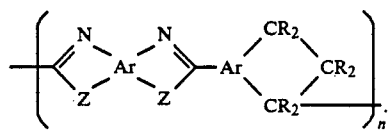
6(a)

Preferably, the divalent organic moiety contains a linking moiety (A), which links the saturated ring of the indan moiety to the 2-carbon of a benzazole moiety in an adjacent mer unit, for instance as illustrated in formula 7(b)

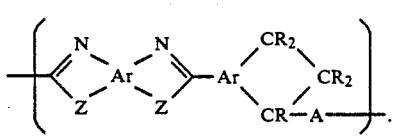
7(b)

The linking moiety (A) should not interfere with the synthesis, fabrication and use of the polymer, and preferably does not add substantially to the degree of freedom in the system. It is preferably a para-oriented aromatic group, such as a p-phenylene or a 4,4'-biphenylene moiety. The linking group (A) may contain substituents to limit rotation, such as methyl or t-butyl groups, as previously described. Bonds to aromatic groups in the linking moiety are preferably in para position with respect to each other.

Polymers of the present invention preferably comprise a plurality of repeating moieties represented by formula 8(a)

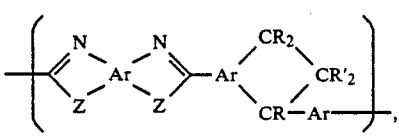
8(a)

more preferably comprise a plurality of repeating moieties represented by formula 8(b)

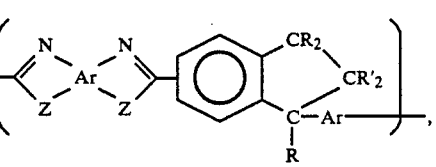
8(b)

and most preferably comprise a plurality of repeating moieties represented by Formula 8(c) or 8(d)

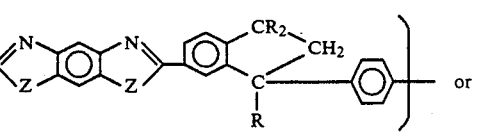
8(c)

or

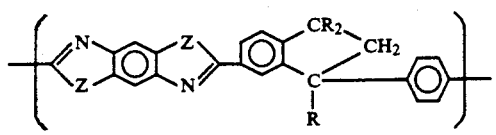

8(d)

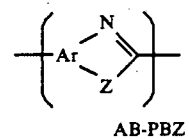

10

AB-PBZ wherein each Z, R and R' has the meaning previously described.

Polymers of the present invention may be synthesized by known processes for making PBZ polymers. A BB-monomer is reacted with an AA-monomer containing an indan moiety as previously described. Suitable AA-monomers include 1,1,3-trimethyl-3-phenylindan-4',5-dicarboxylic acid, which is commercially available from Amoco and is illustrated in Formula 9

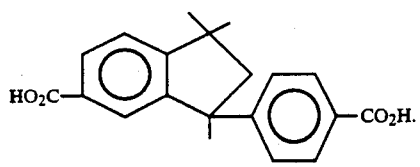

9

Other indan-containing AA-monomers may be synthesized by obvious substitution of reagents and variations on a number of known processes, such as processes described in U.S. Pat. Nos. 4,007,225 (particularly at column 3): 4,166,131: 4,183,859: 4,224,341; 4,269,848: 4,406,828 and 4,481,133 and in Steitz et al., 40 J. Paint Tech 384 (1968): Bergman et al, 26 J. Org. Chem. 3555 (1961); Scherks 18 Chem. Berichte 378 (1885) and Baeyer, 17 Chem Berichte 1222 (1884), all of which are incorporated herein by reference.

BB-monomers and their synthesis are previously described. Polymerization processes typically have the steps of: (1) forming a solution of AA- and BB-monomer in a non-oxidizing, dehydrating solvent acid: (2) removing volatile protective acids, if any, from the BB-monomer: and (3) heating the solution with vigorous agitation in a stepwise or gradual manner from a temperature of about 60° C. to a temperature between about 150° C. and 230° C. The solvent acid is preferably polyphosphoric acid or a mixture of methanesulfonic acid and $P_2O_5$. The protective acid associated with the BB-monomer is preferably hydrogen chloride or phosphoric acid. The temperature of the reaction is preferably commenced at no more than about 65° C. and reaches between 190° C. and 210° C. The atmosphere of the reaction is preferably nitrogen atmosphere. The concentration of monomer should be high enough to produce a dope having sufficient polymer to form a shaped article.

Certain obvious variations in the polymerization may be practiced to create copolymers containing similar variations. First, a portion of AB-monomer may be added to the polymer to create random or block copolymers containing AB-mer units. AB-monomers are previously illustrated and described. The AB-mer unit comprises an aromatic group fused with single azole ring and connected with the remainder of the polymer by single bonds to the aromatic group and the 2-carbon of the azole ring. The AB-mer unit is preferably represented by Formula 10.

The single bond to the aromatic group is preferably in para position with respect to either the nitrogen or the oxygen atom of the azole ring.

A mixture of two or more AA-monomers may be polymerized with BB-monomers, and/or a mixture of two or more BB-monomers may be polymerized with AA-monomers to create random or block copolymers having a plurality of different AA/BB-mer units. When a mixture of AA-monomers is used, not all need contain indan moieties as long as some do. Some may contain other divalent organic moieties (DM), such as m- and p-phenylene moieties and other moieties corresponding to AA-monomers previously described. The divalent organic moieties (DM) of AA/BB-mer units in the resulting polymer reflect the AA-monomer used to make the polymer. When a mixture of BB-mer units is used, it may contain monomers suitable for making both PBO and PBT polymers, so that a PBO/PBT random or block copolymer is formed. It may contain monomer suitable to make essentially rigid rectilinear moieties or flexible non-linear moieties or both. Benzo-bis-azole moieties of the resulting polymer will reflect the BB-monomers used to synthesize the polymer.

Each of the variations can be expected to affect the degree of order in the resulting polymer, and therefor the permeability, flux and selectivity of any membranes synthesized from the polymer. As few as about 1 mole percent of AA-monomers used in polymerization, and divalent organic moieties (DM) of the resulting polymers, may contain indan moieties. Preferably, at least about 25 percent of the AA-monomers in the reaction mixture, and the mer units in the resulting polymer, contain indan moieties and more preferably at least about 50 percent do.

The polymerization produces an acid dope containing the polymer. The polymer can be coagulated from the dope by contacting it with a nonsolvent which dilutes the solvent acid. Suitable non-solvent diluents may be organic but are preferably aqueous. Aqueous diluents may be basic or even mildly acidic, but are preferably about neutral, at least at the commencement of the coagulation process. The coagulated product substantially retains the shape of the dope at the time of coagulation. If desired, the coagulated polymer may be redissolved in another solvent to form a new dope which is coagulated into final form. Such solvents are typically solvent acids, as previously described, although some polymers are also soluble in m-cresol and other organic solvents. The dope should contain sufficient polymer that it can be formed into a shaped article.

The dope, whether that resulting from polymerization or that resulting from coagulating and redissolving the polymer, may be spun and coagulated by a dry-jet wet-spin process to form fibers, or extruded and coagulated by a rotating drum process to form films, according to known processes such as those described in 11 Ency. Poly. Sci. & Eng., supra, at 625-28: U.S. Pat. No. 4,533,693 at Columns 82-84: Hwang et al., "Solution Processing and Properties of Molecular Composite Fibers and Films," 23 Poly. Eng. & Sci. 784, 785 (1984);

and Hwang et al., "Composites on a Molecular Level: Phase Relationships, Processing, and Properties," B22(2) J. Macromol. Sci.-Phys. 231, 234–35 (1983), which are incorporated by reference. Fibers and films can be used to synthesize composites and laminates, and films may be used as dielectric materials according to known processes.

Membranes of Indan-Containing Polymers

A preferred use for polymers of the present invention is as membranes for separation of gases. For example, the polymer may be formed into hollow fibers, cast or extruded films, hollow tubes or other thin shaped articles. The membranes of the present invention typically form a dense homogeneous membrane, or the dense discriminating layer of a composite or asymmetric membrane.

The membrane should be thin enough to permit transportation of gases across the membrane at a reasonable flux rate and thick enough to provide reasonable selectivity and reasonable strength essentially without pinholes or other defects in the discriminating layer. The desirable thickness of the membrane will depend upon its desired use. Homogeneous membranes and asymmetric membranes must be thick enough to support themselves without breakage. On the other hand, the discriminating layer on a composite membrane is supported by a separate porous layer and may be thinner.

Gas-separation membranes can not simply be coagulated from polyphosphoric acid in the same manner that fibers and films are. Coagulation of drawable and/or extrudable polyphosphoric acid dopes in water using standard conditions causes the formation of a microporous membrane having an average pore size between about 10 angstroms and about 2 $\mu$m. Such membranes may be useful for microfiltration or ultrafiltration, but they are too porous to serve as a discriminating layer for gas separation.

At least two methods are useful to prepare gas-separation membranes from dopes comprising the indan-containing polybenzazole polymer and a volatile solvent such as m-cresol and sometimes methanesulfonic acid. If the polymer has been synthesized in a less volatile solvent, such as polyphosphoric acid, then it should be coagulated and dissolved in a more volatile solvent to form a new dope. Then, the dope is formed into a desired shape, such as by casting upon a substrate, spinning and drawing as a hollow fiber, or extruding as a flat sheet or hollow tube.

In one method the volatile solvent is evaporated off to the extent possible. If the solvent is a less-volatile solvent and has an affinity for the polymer, such as methanesulfonic acid, it may be only partially evaporated. In such a case, it may be necessary to wash the remainder of the solvent out with a non-solvent and then dry the resulting membrane. More volatile solvents, such as m-cresol, are preferred because they do not need the washing step, but they may not be powerful enough as solvents for some polymers having a high degree of rigidity and few indan or other kinked moieties.

In a second method, the dope is contacted with a volatile diluent, which is selected such that it is a diluent and solvent for the solvent acid but a non-solvent and precipitent for the polymer. Examples of suitable diluents include a $C_{1-4}$ alkanol or a mixture of $C_{1-4}$ alkanol and water. The diluent partially leaches the solvent acid out of the coagulated polymer, and then the diluent and the remaining solvent acid are evaporated from the coagulated polymer as previously described.

The second method may be modified to provide an asymmetric polymer. A non-solvent pore-forming compound may be added to the dope before coagulation, and then leached out of the coagulated polymer during or after coagulation by a solvent that dissolves the pore-forming compound but not the polymer. Under such conditions, the pore forming compound tends to concentrate in the center of the membrane and, if the dope is coagulated on a non-porous support, against the support, while a dense skin forms upon the surface(s) in contact with the coagulant. The coagulated polymer is then dried as before.

A membrane made by any of the previous methods is preferably heat-treated in order to densify it. Heat treatment is preferably carried out under nitrogen atmosphere at a temperature of at least 100° C. The temperature must be low enough that the membrane does not substantially degrade. It is preferably no more than about 350° C. and more preferably no more than about 300° C. The time of heat treating is preferably at least 1 minute and at most 24 hours. Persons of ordinary skill in the art will recognize that the optimum time for heat treatment varies depending upon the temperature of heat treatment and other factors. In an asymmetric membrane, the heat treatment is carried out in hot water before drying.

The preceeding processes can be adapted to a number of processes for casting membranes, extruding flat or tubular membranes, and spinning hollow fibers.

Casting of membranes from a dope solution is carried out by known processes. The dope solution should be homogeneous and possess sufficient viscosity to allow casting of the solution onto a uniform surface. A solution of polymer in m-cresol preferably contains between about 0.1 and about 50 weight percent polymer, more preferably between about 5 and about 20 weight percent polymer, and most preferably about 10 weight percent polymer. A solution of polymer in methanesulfonic acid preferably contains between about 0.1 and about 10 weight percent polymer, and more preferably between about 1 and about 5 weight percent polymer.

To make an isotropic membrane, the dope can be cast onto a uniform surface possessing a low surface energy such as silicone or Teflon TM coated glass, or a surface to which the membrane will not adhere such as mercury, or a liquid with which the polymer dope is substantially immiscible such as water. Alternately, the membrane may be cast onto a surface which may be dissolved away from the membrane following curing and drying. Casting is performed by pouring the dope onto the appropriate surface and using an appropriate tool, such as a doctor knife, to form a film of the appropriate thickness. A continuous casting process may be achieved by casting the dope onto endless belts or rotating drums. The homogeneous membrane cast as described above may be adhered to a supporting layer to form a composite membrane.

However, composite membranes are preferably fabricated by casting dope directly on a porous supporting layer and coagulating to form a thin discriminating layer. The supporting layer acts as the surface for casting as previously described. Such membranes possess a discriminating layer which generally has a different structure and composition than the porous supporting layer. Penetration of the polymer from which the discriminating layer is formed into the pores of the porous supporting layer is acceptable so long as the overall desired thickness of the membrane is not exceeded, and the flux through the porous membrane is not adversely affected by plugging of the porous structure.

The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane having a high degree of porosity and pores of small enough size that they are readily bridged by the discriminating layer.

The porous polymeric membrane should be one which is stable and relatively insoluble in the solvent used to form the dope. Exemplary porous polymeric membrane materials include, for various solvent-/polymer combinations, polyolefins, polystyrenes, polyetherketones, polyetheretherketones, polyimides, polycarbonates, polysulfones, polyphenylene sulfides, polyesters, cellulose esters, cellulose ethers, polyethersulfones, porous rigid-rod polybenzazole films and the like.

Asymmetric and isotropic membranes are preferably fabricated by extrusion or spinning, rather than casting. Extruded membranes are preferably in the form of a film or tube, and spun membranes in the form of a hollow fiber. The components of the extrusion mixture may be combined prior to extrusion by mixing in any convenient manner with conventional mixing equipment, as for example, in a Hobart mixer or a resin kettle. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The homogenized dope is extruded through a film or tubular die or spun and drawn through a hollow fiber die (spinnerette) under conditions at which it remains homogeneous and flowable. Film extrusion dies and techniques are conventional, as previously described. Hollow fiber spinnerettes are typically multi-holed and thus produce a tow of multiple hollow fibers. The hollow fiber spinnerettes include a means for supplying fluid to the core of the extrudate. A fluid is introduced into the core lumen to prevent collapse of the hollow fibers as they exit the spinnerette. The core fluid may be a gas such as nitrogen, air, carbon dioxide, or other inert gas, or a liquid which is a non-solvent for the polymer such as water. If the core fluid is a diluent for the solvent and a non-solvent for the polymer, such as a lower alkanol, then coagulation of the polymer commences as soon as the dope is contacted with the core fluid.

Optimal membrane thicknesses vary across a range familiar to persons of ordinary skill in the art, depending upon the intended use of the membrane. An isotropic membrane is preferably as thin as possible while maintaining mechanical integrity. Its thickness is preferably between about 10 and about 500 microns, and more preferably between about 50 and about 200 microns. Hollow fiber isotropic membranes preferably have an outer diameter of between about 30 and about 800 microns, more preferably between about 30 and about 300 microns. They preferably have a wall thickness between about 10 and about 100 microns, and more preferably between about 10 and about 50 microns.

The discriminating layer in composite or asymmetric membranes preferably possesses a thickness of between about 0.01 and about 10 microns, more preferably between about 0.02 and about 2 microns. Preferably the supporting layer in composite or asymmetric membranes possesses a thickness of between about 10 and about 500 microns, more preferably between about 25 and about 150 microns. Hollow fiber composite or asymmetric membranes preferably have an outer diameter in the range of from about 30 to about 800 microns, more preferably in the range of from about 50 to about 500 microns. They preferably have a wall thickness between about 10 and about 200 microns, and more preferably between about 20 and about 100 microns. The degree of porosity in a composite or asymmetric membrane is preferably at least about 10 percent of the volume of the membrane, and is preferably no more than about 75 percent of the membrane volume, more preferably no more than about 60 percent.

The membranes are generally sealingly mounted in a pressure vessel in such a manner that the membrane separates the vessel into two zones, a high-pressure zone and a low pressure zone, wherein fluid flow between the two zones is accomplished by fluid permeating through the membrane. Where membranes are thin or highly deformable, a frame or screen may also be used to adequately support the membrane. If the membrane is a hollow fiber and the desired product is the more slowly permeating gas, the gas may be introduced under pressure into the inside of the fiber, and the low pressure zone may be simply the open air outside the fiber, as described in U.S. Pat. No. 4,871,375, which is incorporated herein by reference.

The peripheral area of a flat film membrane is ordinarily affixed to a framing structure which supports the outer edge of the membrane. The frame may also support a screen which supports the membrane. The membrane can be affixed to the framing structure by a clamping mechanism, adhesive, chemical bonding, or other techniques known in the art. The frame may also support a screen which supports the membrane. The membrane affixed to the frame can be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane. The membrane separates a higher pressure means on one side of the membrane into which the feed gas mixture is introduced from a lower pressure zone on the other side of the membrane. The membrane is contacted with a feed gas mixture under pressure, while a pressure differential is maintained across the membrane.

When the membrane is in hollow fiber form, the feed gas mixture may be introduced on the outside or on the inside of the hollow fiber. Thus, either the inside or the outside of the fiber serves as the high pressure zone, the other side of the fiber serving as the low pressure zone.

At least one gaseous component in the gas mixture selectively permeates through the membrane from the high pressure zone to the low pressure zone more rapidly than the gaseous other component(s) in the gas mixture. A gaseous mixture which is enriched in the faster permeating gaseous component(s) is obtained on the lower pressure side of the membrane which is removed from the lower pressure zone as permeate. A gaseous mixture enriched in the slower permeating gaseous component(s) is obtained on the higher pressure side of the membrane which is removed from the higher pressure zone as non-permeate.

Gas phase separations are carried out at pressures and temperatures which do not deleteriously effect the membrane. Depending upon the gases separated and thickness and support of the membrane, those pressures can be as low as about 1 atmosphere or as high as about 5000 atmospheres. The pressure across the membrane for separation of oxygen from nitrogen is preferably between about 50 and about 150 psi. For separation of methane from carbon dioxide, the pressure across the membrane is preferably between about 100 and about 2000 psi, and more preferably is about 500 psi. Even higher pressures may be preferred for separating hydrogen or helium from other gases. The pressure in the low pressure zone may be sub- or super-atmospheric, but is conveniently about atmospheric pressure.

The membranes of the present invention may be used to separate mixtures of gases. Examples of component gases of interest include hydrogen, helium, oxygen, nitrogen, carbon monoxide, carbon dioxide, water vapor, hydrogen sulfide, ammonia, and/or light hydrocarbons. As used herein, the term light hydrocarbons refers to gaseous saturated and unsaturated $C_{1-4}$ hydrocarbons such as methane, ethane, ethylene, propane, propylene, butane, and butylene. Exemplary applications of particular interest include the separation of hydrogen or helium from gas mixtures such as gas mixtures containing nitrogen, carbon monoxide, carbon dioxide, water vapor, and/or light hydrocarbons; and separation of nitrogen and/or oxygen from air: and separation of carbon dioxide from methane.

The selectivity of the membrane varies widely depending upon the polymer, the fabrication conditions for the membrane, the temperature of separation and the mixture of gases, to name a few factors. The separation factor for separating oxygen from nitrogen at 30° C. is preferably at least about 5 and more preferably at least about 7. The separation factor for separating carbon dioxide from methane at 30° C. is preferably at least about 15, more preferably at least about 20, and most preferably at least about 30. The separation factor for separating helium or hydrogen from methane at 30° C. is preferably at least about 50, more preferably at least about 100, and most preferably at least about 300.

The following examples show the polymer, its synthesis and its use.

Illustrative Embodiments

The following examples are given to illustrate the invention and should not be interpreted as limiting it in any way. Unless stated otherwise, all parts and percentages are given by weight.

EXAMPLE 1 - Synthesis of Polymer From 4,6-Diamino-Resorcinol and 1,1,3-Trimethyl-3-Phenylindan-4′,5-Dicarboxylic Acid (PIDA-PBO)

About 18.27 grams 1,1,3-trimethyl-3-phenylindan-4′,5-dicarboxylic acid, about 45.9 grams phosphorous pentoxide ($P_2O_5$), and about 369.1 grams polyphosphoric acid (PPA) are transferred to a 500-milliliter resin kettle. The resin kettle is equipped with a stainless steel stirrer and blade, nitrogen inlet, drying tube, silicone bath heat source, and high torque stirrer. The reactants are stirred at about 80° C. for about 4 hours while purging the kettle with nitrogen. About 12 grams of diaminoresorcinol dihydrochloride (DAR) are then added to the reaction mixture. The mixture is then heated according to the following schedule: about 80° C. for about 24 hours, about 120° C. for about 24 hours, and about 180° C. for about 8 hours.

The polymer, comprising a plurality of mer units represented by Formula 7(c) wherein each R is a methyl group and each Z is an oxygen atom, is isolated by precipitating the reaction solution in water and washing the polymer with methanol. The resulting polymer is soluble in methane sulfonic acid and m-cresol. The polymer exhibits a glass transition temperature of greater than about 400° C., a weight loss of about 5 percent at about 525° C. as measured by thermogravimetric analysis, and an equilibrium water content of about 0.65 weight percent as measured by soaking a film sample in water until it reaches constant weight and then measuring the weight gain.

EXAMPLE 2 - Fabrication and Use of a Gas Separation Membrane Comprising PIDA-PBO A homogeneous amber-colored flexible thin film is cast from an m-cresol solution containing about 8 weight percent PIDA-PBO polymer synthesized as described in Example 1. The film has a thickness of 0.00313 cm. The film is then evaluated for gas separation performance using a constant-volume, variable-pressure test apparatus. For a description of the constant-volume variable-pressure gas permeability test method, see Pye, Hoehn, and Panar, "Measurement of Gas Permeability of Polymers. I. Permeabilities in Constant-Volume/Variable Pressure Apparatus," *Journal of Applied Polymer Science*, Vol. 20, 1976, pp. 1921–1931, the relevant portions relating to gas permeability measurement are incorporated herein by reference. The film has a permeability of about 10.45 barrers with respect to helium and 0.022 Barrers with respect to methane, corresponding to a selectivity of about 500.

EXAMPLE 3 - Fabrication and Use of a Gas Separation Membrane Comprising PIDA-PBO A membrane is fabricated and tested as described in Example 2, and its permeability is tested with respect to oxygen, nitrogen, methane, ethylene, and helium at 30 and 50 psig pressure. The membrane has a permeabiliuty of 8.3 Barrers (Ba) for nitrogen, 37 Ba for oxygen, 10.9 Ba for methane, 17.2 Ba for ethylene, and 121 Ba for helium.

EXAMPLE 4 - Synthesis of a Jointed PIDA-PBO Polymer

A mixture of 242 g of 81 percent polyphosphoric acid; 10.00 g of bis-(3-amino-4-hydroxyphenyl)-1,1,1,3,3,3-hexafluoroisopropylidene bis(hydrogen chloride): and 8.86 g of 1,1,3-trimethyl-3-phenylindan-4′,5-dicarboxylic acid is heated with vigorous agitiation at a temperature of 120° C. for 15 hours. A 77 g quantity of phosphorus pentoxide is added. The reaction is continued at 160° C. for 8 hours, at 180° C. for 20 hours and at 190° C. for 7 hours. The reaction mixture is cooled to 100° C., placed in 3 L of water and dispersed in a blender. The polymer is filtered, washed with hot water, and dried under vacuum at 110° C. The resulting polymer is soluble in m-cresol, methanesulfonic acid and trifluoroacetic acid. It is theorized to be comprise a repeating unit structure that is represented by the Formula 11:

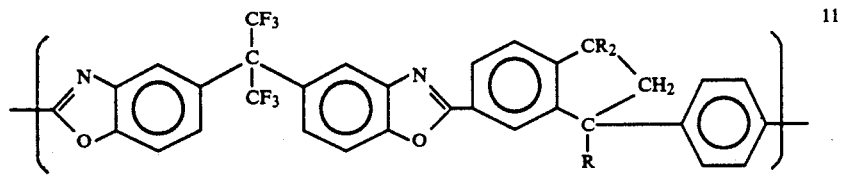

wherein each R is a methyl group.

EXAMPLE 5 - A Membrane of Jointed PIDA-PBO

A mixture containing 2 g of polymer from Example 4 and 11.3 g of m-cresol is heated and stirred until the polymer dissolves. The solution is pressure filtered through a 10 m Teflon ™ polymer filter at a pressure of 30 psi. The solution is cast on a glass plate and dried under nitrogen atmosphere at 50° C. for about 3 hours. The membrane is further dried under vacuum for 30 hours at 50° C. and for 2 hours at 110° C. The membrane is removed from the plate under water and redried between sheets of aluminum at about 300° C. It has a permeability for helium of about 36.3 Barrers and a selectivity between helium and methane of about 56, when measured as described in Example 2.

What is claimed is:

1. A polybenzoxazole or polybenzothiazole polymer containing a plurality of repeating units which comprise:
   (1) a benzo-bis-azole moiety containing a first aromatic group fused with a first and a second azole ring, each azole ring being selected from the group consisting of oxazole and thiazole rings; and
   (2) a divalent organic moiety bonded to the 2-carbon of the first azole ring, said divalent organic moiety containing an indan moiety
wherein each indan moiety contains a second aromatic ring fused to a five-membered ring which is saturated, except for the two carbon atoms which are part of the second aromatic group, and each indan moiety is linked to the rest of the polymer by a single bond to the second aromatic group and a single bond to the saturated ring.

2. The polymer of claim 1 wherein each aromatic group is a carbocyclic group comprising no more than about 18 carbon atoms.

3. The polymer of claim 2 wherein the first aromatic group is represented by either of the Formulae:

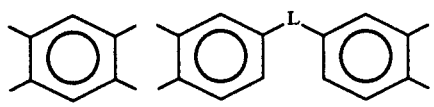

wherein L is a carbonyl moiety, sulfonyl moiety, an oxygen atom, a lower (C$_{1-6}$) alkyl group, a halogenated lower alkyl group or a bond.

4. The polymer of claim 2 wherein each azole ring is an oxazole ring.

5. The polymer of claim 2 wherein each azole ring is a thiazole ring.

6. The polymer of claim 2 wherein the second aromatic group is a six-membered ring, and the bond to the second aromatic group is para to either the 1- or 3-carbon of the saturated ring.

7. The polymer of claim 2 wherein the bond to the saturated ring is to the 1- or 3-carbon.

8. The polymer of claim 2 wherein the indan moiety contains substituents of sufficient number and size to inhibit rotation of the indan moiety around single bonds that alters the contour of the polymer chain.

9. The polymer of claim 8 wherein one of the 1- and 3-carbons of the indan moiety has two lower alkyl substituents and the other has one lower alkyl substituent and a bond linking it to other mer units in the polymer.

10. The polymer of claim 9 wherein each lower alkyl substituent is a t-butyl or methyl moiety.

11. The polymer of claim 2 wherein the indan moiety in one mer unit is linked to the 2-carbon of an azole ring in an adjacent mer unit by a divalent linking moiety that does not interfere with the synthesis, fabrication and use of the polymer.

12. The polymer of claim 11 wherein the linking moiety is as a p-phenylene or 4,4'-biphenylene moiety.

13. The polymer of claim 2 wherein each indan-containing mer unit is represented by the Formula:

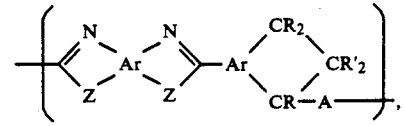

wherein each R and R' is independently a hydrogen atom or a lower alkyl group, each Z is an oxygen or a sulfur atom, and A is a bond or divalent linking moiety which does not interfere with the synthesis, fabrication or use of the polymer.

14. The polymer of claim 13 which is represented by the Formula:

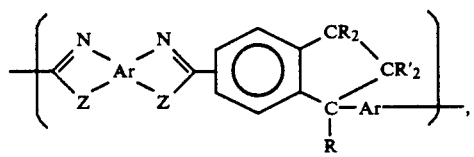

15. The polymer of claim 13 which is represented by one of the Formulae:

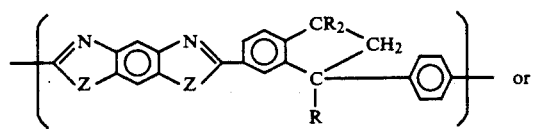

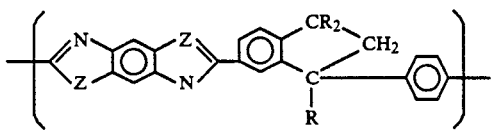

16. The polymer of claim 15 wherein at least about 50 percent of the mer units in the polymer contain an indan moiety.

17. A membrane comprising a polybenzoxazole or polybenzothiazole polymer that contains a plurality of repeating units which comprise a moiety represented by the Formula:

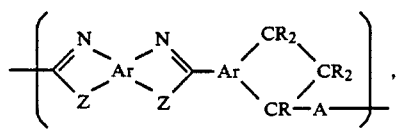

wherein: each Ar is an aromatic group,
each Z is independently an oxygen atom or a sulfur atom,
each R is a hydrogen atom or substituent that does not interfere with the synthesis, fabrication or use of the membrane, and
each A is bond or a divalent linking moiety that does not interfere with the synthesis, fabrication or use of the membrane.

18. The membrane of claim 17 wherein each R is a hydrogen atom, a lower alkyl group or a halogen.

19. The membrane of claim 17 wherein each aromatic group is a six-membered carbocyclic ring.

20. The membrane of claim 17 wherein A is a para-ordered aromatic group.

21. The membrane of claim 17 wherein the membrane is either a flat membrane at least about 10 microns thick and at most about 510 microns thick or a hollow fiber or tube whose walls are at least about 10 microns thick and at least about 200 microns thick.

22. The membrane of claim 21 wherein the polymer contains a plurality of mer units represented by the Formula:

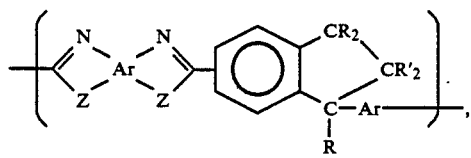

wherein each R and R' is independently a hydrogen atom, a lower alkyl group or a halogen.

23. The membrane of claim 22 wherein essentially all of the mer units in the polymer are mer units illustrated in claim 22.

24. The membrane of claim 21 wherein the polymer contains a plurality of mer units represented by the one of Formulae:

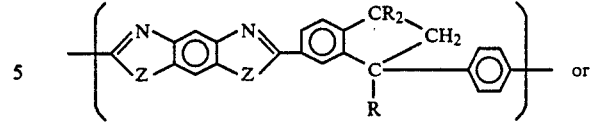

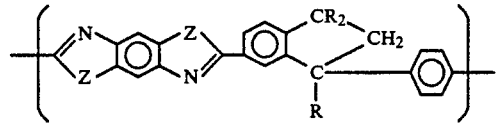

wherein each R is a methyl, t-butyl, phenyl or cyclohexyl moiety.

25. The membrane of claim 24 wherein each R is a methyl group or a t-butyl group.

26. The membrane of claim 24 wherein each Z is an oxygen atom.

27. The membrane of claim 24 wherein each Z is a sulfur atom.

28. The membrane of claim 24 wherein at least about 50 percent of the mer units in the polymer are mer units illustrated in claim 24.

29. The membrane of claim 21 wherein at least about 50 percent of the mer units in the polybenzoxazole or polybenzothiazole polymer contain indan moieties.

30. The membrane of claim 21 wherein essentially all of the mer units in the polybenzoxazole or polybenzothiazole polymer contain indan moieties.

31. The membrane of claim 21 wherein the membrane is an isotropic membrane.

32. The membrane of claim 31 wherein the membrane is a hollow fiber or tube, and the membrane walls are at most about 100 microns thick.

33. The membrane of claim 32 which has an outer diameter of between about 30 microns and about 800 microns.

34. The membrane of claim 31 wherein the membrane is a flat film membrane.

35. The membrane of claim 17 wherein the membrane is a composite membrane that contains (a) a discriminating layer containing the polybenzoxazole or polybenzothiazole polymer and (b) a supporting layer.

36. The membrane of claim 35 wherein the discriminating layer is between about 0.01 microns and about 10 microns thick.

37. The membrane of claim 36 wherein the membrane is a hollow fiber having an outer diameter of at least about 30 microns and at most about 800 microns.

38. The membrane of claim 21 wherein the membrane is an asymmetric membrane.

39. The membrane of claim 38 wherein the membrane is a hollow fiber having an outer diameter of at least about 30 microns and at most about 800 microns.

40. The membrane of claim 17 wherein the separation factor of the membrane is at least about 5 for separating oxygen from nitrogen at about 30° C.

41. The membrane of claim 17 wherein the separation factor of the membrane is at least about 300 for separating hydrogen or helium from methane at about 30° C.

42. The membrane of claim 17 wherein the separation factor of the membrane is at least about 20 for separating carbon dioxide from methane at about 30° C.

43. A process for separating a mixture of gases, said process comprising the step of placing the mixture of gases in a higher pressure zone which is divided from a lower pressure zone by a membrane of claim 17 under conditions such that at least one gas permeates through the membrane at a faster rate that another gas in the mixture.

44. The process of claim 43 wherein the pressure in the higher pressure zone is between about 50 psi and about 500 psi higher than the pressure in the lower pressure zone.

45. The process of claim 43 wherein the mixture of gases contains at least two gases selected from the group consisting of hydrogen, helium, oxygen, nitrogen, carbon monoxide, carbon dioxide, water vapor, hydrogen sulfide, ammonia, and light hydrocarbons.

46. The process of claim 43 wherein the membrane contains a discriminating portion in which at least about 50 percent of the mer units are represented by the Formula:

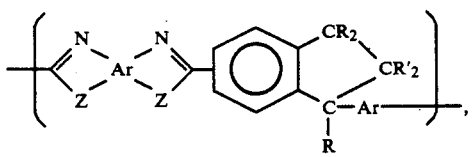

wherein each R and R' is a hydrogen, methyl, t-butyl, phenyl or cyclohexyl moiety.

47. An apparatus comprising:
(1) a higher pressure zone which can maintain a mixture of gases at a relatively high pressure;
(2) a membrane of claim 17;
(3) a low pressure pressure zone,
said elements being arranged such that at least one gas in the high pressure zone enters the low pressure zone by permeating through the membrane but by no other pathway.

48. The apparatus of claim 47, wherein the membrane is a hollow fiber, the high pressure zone is on the inside of the fiber, and the low pressure zone is on the outside of the fiber.

49. The apparatus of claim 47, wherein the membrane is a hollow fiber, the high pressure zone is on the outside of the fiber, and the low pressure zone is on the inside of the fiber.

50. The apparatus of claim 47 wherein the membrane is a flat sheet that separates a vessel into the high pressure zone and the low pressure zone.

51. The apparatus of claim 47 wherein the high pressure zone contains at least two gases, of which at least one is selected from the group consisting of hydrogen, helium, oxygen, nitrogen, carbon monoxide, carbon dioxide, water vapor, hydrogen sulfide, ammonia, and light hydrocarbons.

52. The apparatus of claim 47 wherein the membrane contains a discriminating portion in which at least about 50 percent of the mer units are represented by the Formula:

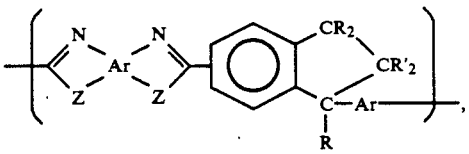

wherein each R and R' is a hydrogen, methyl, t-butyl, phenyl or cyclohexyl moiety.

* * * * *